US011798069B2

(12) United States Patent
Mezaael

(10) Patent No.: US 11,798,069 B2
(45) Date of Patent: Oct. 24, 2023

(54) SYSTEMS AND METHODS FOR SECURE PEER-TO-PEER VEHICLE RENTALS

(71) Applicant: Ford Global Technologies, LLC, Dearborn, MI (US)

(72) Inventor: Abraham Mezaael, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 17/321,768

(22) Filed: May 17, 2021

(65) Prior Publication Data

US 2022/0366481 A1 Nov. 17, 2022

(51) Int. Cl.
*G06Q 30/0645* (2023.01)
*G06Q 50/30* (2012.01)

(52) U.S. Cl.
CPC ........ *G06Q 30/0645* (2013.01); *G06Q 50/30* (2013.01); *G06Q 2220/00* (2013.01)

(58) Field of Classification Search
CPC . G06Q 30/0645; G06Q 50/30; G06Q 2220/00
See application file for complete search history.

(56) References Cited

U.S. PATENT DOCUMENTS

| | | | | |
|---|---|---|---|---|
| 2016/0163138 | A1* | 6/2016 | Turner | G07C 9/00896 340/5.7 |
| 2016/0357183 | A1* | 12/2016 | Shaw | G05D 1/0027 |
| 2019/0026829 | A1 | 1/2019 | Nakata et al. | |
| 2019/0259093 | A1* | 8/2019 | Turato | G06Q 30/06 |
| 2020/0164886 | A1 | 5/2020 | Dutta et al. | |
| 2020/0193744 | A1 | 6/2020 | Pratz et al. | |
| 2020/0269861 | A1* | 8/2020 | Liffman | B60W 50/14 |

OTHER PUBLICATIONS

V. Valaštín, K. Košt'ál, R. Bencel and I. Kotuliak, "Blockchain Based Car-Sharing Platform," 2019 International Symposium ELMAR, 2019, pp. 5-8, doi: 10.1109/ELMAR.2019.8918650. (Year: 2019).*
Siu-Yeung Cho et al, "Developing a Vehicle Networking Platform Based on Blockchain Technology", University of Nottingham Ningbo China, Ningbo, China, Springer Nature Switzerland AG 2019, ICBC 2019, LNCS 11521, pp. 186-201.

* cited by examiner

*Primary Examiner* — Carrie S Gilkey
(74) *Attorney, Agent, or Firm* — Brandon Hicks; Eversheds Sutherland (US) LLP

(57) ABSTRACT

The disclosure is directed to, among other things, systems and methods for secure peer-to-peer vehicle rentals. An example method may include receiving, by a node in a distributed ledger network, a request to rent a first vehicle. The example method may also include storing, based on receiving the request, a rental agreement for the vehicle as a transaction on a ledger of the distributed ledger network. The example method may also include receiving, by the ledger, data from a telematics control unit (TCU) of the vehicle during the a duration of the rental agreement. The example method may also include storing the data on the ledger, wherein a first device associated with an owner of the vehicle is prevented from remotely controlling a first set of functions of the vehicle during the duration of the rental agreement, and wherein the first device is also prevented from accessing the data on the ledger. The example method may also include enabling, based on the data from the TCU of the vehicle, the first device to perform remote control of the first set of functions of the vehicle.

18 Claims, 3 Drawing Sheets

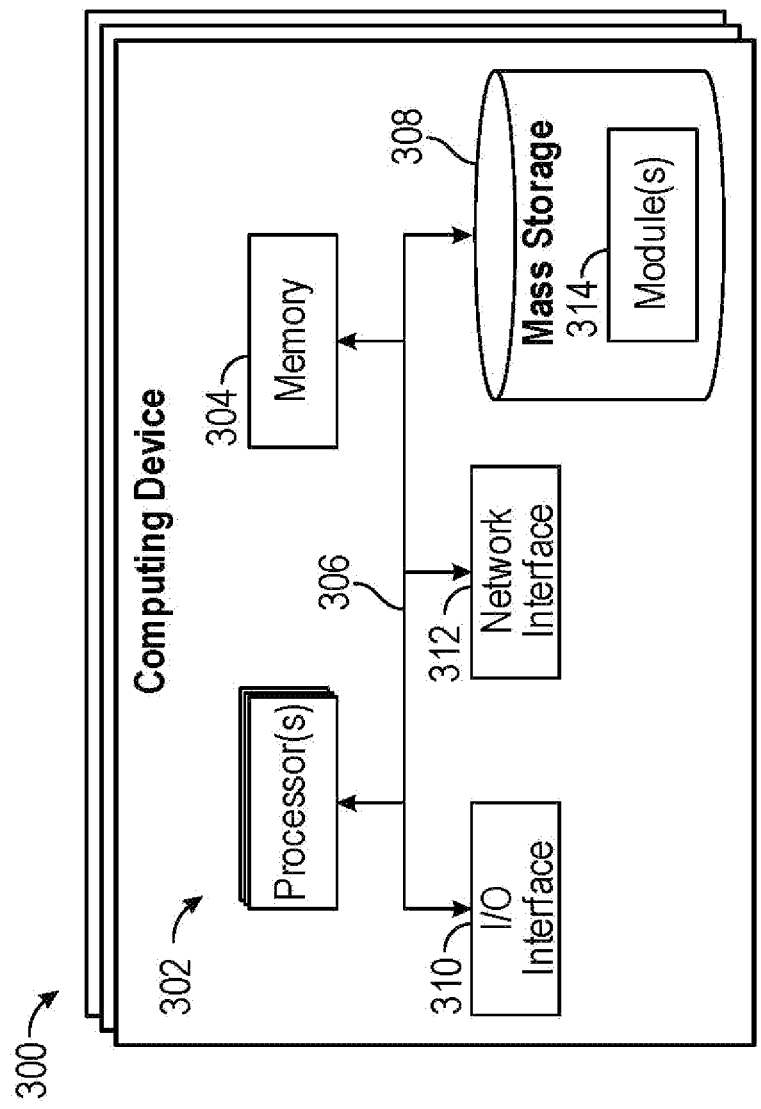

SYSTEMS AND METHODS FOR SECURE PEER-TO-PEER VEHICLE RENTALS

BACKGROUND

Rental car services may be beneficial in that they may allow renters to pay to use a vehicle for a given duration of time subject to a rental agreement. However, in some cases, the renters may have to provide sensitive information to an owner of the vehicle (e.g., personal identifying information, credit card numbers, etc.) that they may not desire to expose to the owner (or third parties). Additionally, vehicles may have the capability to provide data to the owner, and the owner may also have the capability to remotely control some functionality of the vehicle. These may serve as deterrents for potential renters.

BRIEF DESCRIPTION OF THE DRAWINGS

The accompanying drawings form part of the disclosure and are incorporated into the present specification. The drawings, which are not drawn to scale, illustrate some embodiments of the disclosure. The drawings in conjunction with the description and claims serve to explain, at least in part, various principles, aspects, and practical elements of the disclosure. Some embodiments of the disclosure are described more fully below with reference to the accompanying drawings. However, various aspects and elements of the disclosure can be implemented in many different forms and should not be construed as being limited to the implementations set forth herein. Like numbers refer to like, but not necessarily the same or identical, elements throughout.

FIG. 3 illustrates an example of a computing system, in accordance with one or more embodiments of this disclosure.

DETAILED DESCRIPTION

Figure 1:
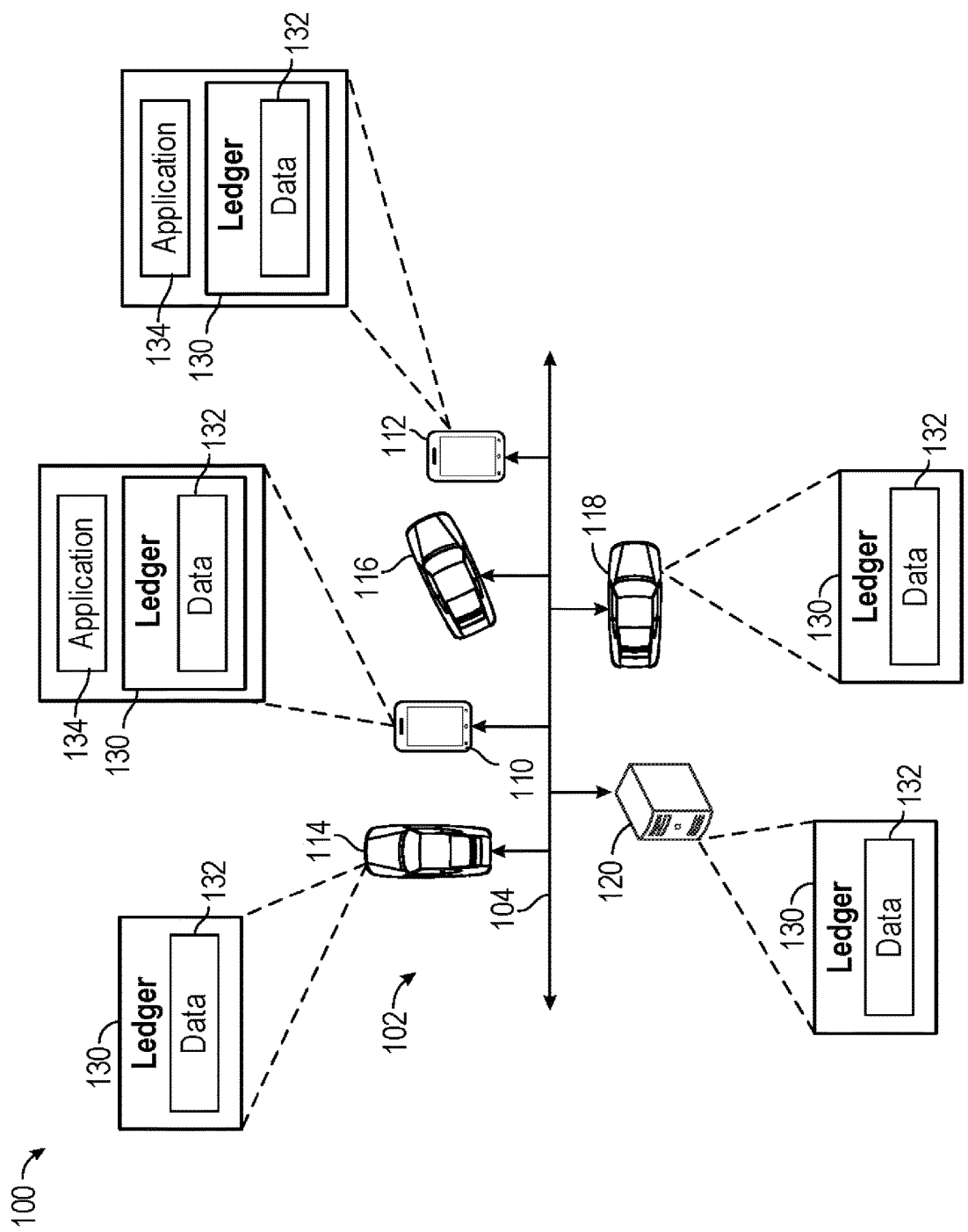
FIG. 1 illustrates an example of an system architecture, in accordance with one or more embodiments of this disclosure.

The disclosure is directed to, among other things, systems and methods for secure peer-to-peer vehicle rentals. Particularly, the systems and methods may involve the use of a distributed ledger system for managing different aspects of a vehicle rental service. Distributed ledger technology may employ a blockchain, for example, which may be an immutable, sequential record of transactions on, or changes in the state of, a specific item of value over a geographically disperse computer network without using a central authority. For example, automotive vehicle ownership and rental agreements may be managed through a distributed ledger, providing the entire transaction history, state changes, and life cycle of a the vehicle before, during, and after the lifetime of one or more rentals of the vehicle. In some embodiments, the Original Equipment Manufacturer (OEM) or an owner of the vehicle could initiate a blockchain by including specific vehicle make, model, and features (build data), the Vehicle Identification Number (VIN), date of manufacture, initial distribution (retail dealer, fleet, rental, lease, etc.), or any other information. From there, information about the usage of the vehicle may be added to the ledger over time through subsequent rentals of the vehicle. In this way, the blockchain acts like a biography of the vehicle. In some cases, the blockchain may also include information about multiple vehicles, such as a fleet of rental vehicles managed by one or more owners. The use of the distributed ledger system may provide a secure method for data analysis and storage. This may be because the decision to add a transaction to the ledger may be made by consensus of the nodes in the distributed ledger system (for example, a consensus may refer to a majority of nodes determining that the transaction to be added is a valid transaction). The use of a distributed ledger system in this manner may allow for customers (the terms "customer" and "renter" may be used interchangeably herein) to rent vehicles without having to expose sensitive information to the owner or third parties (information associated with the rental transaction may be stored to, and secured in, the ledger. Additionally, the distributed ledger system may be used to allow data to be captured (and stored in the ledger) from the vehicle during rental usage. The use of the ledger system may allow this information to be secured by default, but may also allow the owner to intervene and either access the data or perform remote functions associated with the vehicle if certain triggering conditions are met. Thus, the ledger allows the renter to maintain a certain level of privacy, but also allows the owner to intervene if the renter violates the renter agreement (or requests assistance from the owner or otherwise grants them permission to access any of the data or perform a remote function).

In some embodiments, the rental process may begin with a customer initiating a request to rent a vehicle. The request may be initiated, for example, through an application on a mobile device of the customer (such as the application 134 illustrated in FIG. 1). The request may also be made through any other type of device as well. The request may be associated with certain preferences of the customer as well. For example, the request may include a preferred type of vehicle, a number of seats, a time period during which the customer desired to rent the vehicle, a location that the user wishes to drive the vehicle, or any other relevant information. The request may be received by a node of the distributed ledger network, such as a server. In some cases, the request may be stored to the ledger as a transaction. In further cases, the request may be provided directly to the ledger without going through the server. After the request is received, a vehicle that may be provided as a rental vehicle to the customer may be identified. In some cases, the rental vehicle may be identified from one or more vehicles that are connected to the distributed ledger network as nodes. For example, the ledger may have stored information about different vehicles that are nodes on the distributed ledger network, such as vehicle makes, models, trim levels, VINs, number of seats, current availability, current location, and/or any other relevant information. In some cases, the ledger itself may not necessarily store the information, but rather may store pointers to information that may be stored at remote locations (for example, a remote database). A vehicle may be identified to provide to the customer as a rental vehicle based on the information that is stored about the different vehicles and the preferences provided by the customer in the initial request. In some cases, the identification of the vehicle to provide to the customer may be made by any of the nodes (or combination of nodes) in the distributes ledger network. The selected vehicle may be presented to the customer (for example, through a user interface of the application through which they made the initial request), or the vehicle may be automatically assigned to the customer. A transaction may be added to the ledger indicating that the vehicle has been assigned to the customer. The transaction may also be associated with a rental agreement, which may establish certain parameters of the vehicle rental, such as the time duration of the rental, to name one non-limiting example.

In some embodiments, once the rental agreement is established and stored as a transaction on the ledger, and the duration of the rental agreement has begun, the renter may granted access to the vehicle and may be able to use the vehicle throughout the duration of the rental agreement. In some cases, granting the renter access to the vehicle may involve registering the user or a device associated with the user or provided to the user (for example, a key fob or a mobile device, such as a smartphone) for access to the vehicle. For example, the rental vehicle may have Phone-as-a-Key (PaaK) capabilities, and the mobile device of the renter may be configured (through an application or otherwise) to be used with the PaaK system. As another example, the vehicle may include systems such as biometric systems, passcode entry systems, or the like that the renter may use to access and/or use the vehicle and/or particular features of the vehicle. In some cases, however, the vehicle may not include any of these features, and the renter may simply be provided the keys to the vehicle for manual access. Additionally, in some cases, the renter may only be provided access to certain features of the vehicle. For example, the renter may be preventing from engaging a "sports" mode of the vehicle (however, this is just one example, and any other vehicle features may similarly be applicable). The features of the vehicle that the renter is able to access may be established based on the specific rental agreement, or may be general permissions established by the owner of the vehicle for the specific vehicle or for a fleet of vehicles in general.

In some embodiments, throughout the duration of the rental agreement, data may be captured by the vehicle and provided to the ledger. For example, the data may include data associated with the operation of the vehicle, such as speed, heading, braking events, tire air pressure, heating, ventilation, and air conditioning (HVAC) and/or stereo system usage, fluid levels (for example, oil, transmission, coolant, etc.), engine rotations per minute (RPM), a current location of the vehicle, or any other types of data that may be captured by the vehicle. The data may also include data pertaining to the external and environment surrounding the vehicle. For example, the vehicle may include one or more sensors, such as cameras, that may capture images and/or live video feeds of the external environment. The data may also include data pertaining to particular conditions that may occur during operation of the vehicle. For example, the data may provide an indication of aggressive driving behaviors (hard accelerations, hard braking, high RPMs, speeding, large g-forces, etc.), airbag deployment events, emergency calls made from the vehicle, diagnostic trouble codes (DTCs), towing events, indications of theft or damage to the vehicle, and/or the vehicle leaving a pre-defined geofenced region, to name a few examples. Some or all of this data may be provided to the ledger for storage. For example, the data may be obtained by a telematics control unit (TCU) of the vehicle and provided to the ledger. The TCU may also control what data is obtained by the vehicle. However, the data may be obtained by any other vehicle systems as well. In some cases, any of the data mentioned above, as well as any other types of data, may be captured at any rate. For example, some or all of the data may be captured continuously, or some or all of the data may be captured periodically at particular time intervals. Further, some of the data may be captured only when certain triggering conditions take place (for example, airbag deployment data may be captured upon the triggering condition of an airbag deploying in the vehicle). The data capture may be performed based on user-defined settings. For example, the owner of the vehicle may establish that the vehicle should provide vehicle speed data to the ledger in 30 second intervals. The data capture may also be performed automatically. For example, artificial intelligence, machine learning, other such systems may be used to determine parameters associated with data capture (for example, what types of data are captured, the intervals at which the data is captured, etc.) as well as changes to the manner in which the data is captured. In this manner, the data capture parameters may be adaptive and change over time or based on certain conditions. For example, if it is determined that the vehicle is experiencing frequent aggressive acceleration and braking, the vehicle may begin to capture and provide to the ledger data more pertinent to aggressive driving behaviors and/or may begin capturing such data more frequently.

In some embodiments, the types and/or amounts of data that is captured by the vehicle and stored to the ledger may vary depending on the specific vehicle. That is, the data that is captured may vary depending on parameters such as vehicle type, vehicle performance capabilities, owner-established settings, or any other parameters. For example, a delivery truck that is rented to a customer may capture and store a first subset of data to the ledger and a sports car may provide a second subset of data to the ledger. Continuing this example, it may be assumed that the delivery truck may not necessarily be associated with the same aggressive driving behaviors as a sports car rental, so the data provided to the ledger by the delivery truck may include data such as a current gas level and/or battery level (depending if the delivery truck has an internal combustion engine, is a hybrid vehicle, or is a full electric vehicle). The sports car, on the other hand, may provide more performance-related data to the ledger, such engine RPM, current speed, g-forces, tire air pressure, and the like. These are merely intended to be examples, and these types of vehicles, as well as any other types of vehicles may provide any other types of data to the ledger. Additionally, the types of data obtained and provided to the ledger by these different types of vehicles may be different types of data, may be the same types of data, or may include some similar types of data and some different types of data. For example, both the delivery truck and the sports car may provide information about the current gas level and/or battery level. By selectively choosing different types of data to obtain from different types of vehicles, the processing and storage requirements (as well as data transfer bandwidth requirements) for both the vehicle and the ledger may be reduced. That is, if all of the rented vehicles were to provide all captured data to the ledger at all times, the storage requirements of the ledger may be significantly increased. In some cases, the vehicles may all provide all of the same types of data, but the data may be filtered before being stored to the ledger. In this manner, the filtering shifts from the vehicles themselves (for example the vehicle TCUs) to the ledger or other nodes in the distributed ledger network. There may also be one or more dedicated nodes for managing transactions that take place on the distributed ledger network.

In some embodiments, throughout the duration of the rental agreement, the owner of the vehicle may be prevented from performing some or all remote functions of the vehicle. That is, the vehicle may be configured such that certain vehicle functions may be controlled remotely (for example, the owner of the vehicle may be able to lock the doors of the vehicle using an application on their mobile device, or through any other device as well), and these remote control functions may typically be activated for the owner of the vehicle. However, throughout the duration of the rental agreement, these remote control functions may be deactivated for the owner. A vehicle function may include any operation that the vehicle is capable of performing, such as, for example, locking or unlocking particular doors, remote starting or turning off the vehicle, raising or lowering windows, activating a valet mode, capturing interior or exterior images or video feeds, or any other operation that the vehicle is capable of performing. In some cases, only certain remote control functions may be deactivated for the owner during the rental agreement, but other remote control functions may remain activated. For example, the owner may be enabled to lock the doors of the vehicle, but may not be enabled to turn the vehicle on or off. However, this is merely an example, and the owner may be permitted to, or prevented from, performing any other types of remote functions associated with the vehicle. Similarly, the owner may also be prevented from accessing some or all of the data being captured by the vehicle stored to the ledger. In this manner, the renter may maintain a certain level of privacy and control throughout the duration of the rental agreement.

In some embodiments, while the owner of the vehicle may be preventing from performing some or all of the remote functions associated with the vehicle, these remote functions may be activated under certain conditions. As one example, the owner may be enabled to perform certain remote functions based on a request from the renter of the vehicle. The request may be made through the vehicle itself, through a mobile device application (for example, the application that may be used to initiate the vehicle rental), or through any other suitable devices. The ability of the owner to perform the given remote function(s) may be activated for the remainder of the rental agreement term, or may only be activated temporarily (for example, for a portion of the duration of the rental agreement). For example, the renter of the vehicle may have parked the vehicle and forgotten to lock the doors. The renter may request the owner of the vehicle remotely lock the doors, a remote door locking feature may be enabled for the owner, the owner may remotely lock the doors, and then the feature may then be disabled for the owner. As a second example, certain remote functions may be enabled for the owner based on triggering conditions rather than a manual request from the renter. For example, if it is determined that the vehicle has parked and the door are left unlocked for a threshold period of time or after the renter has walked a threshold distance from the vehicle, then the remote locking feature may be enabled for the owner. As a second example, if the vehicle is determined to be stolen, then a remote function allowing the owner to track and/or turn off the vehicle may be enabled. Additionally, the owner of the vehicle may be able to terminate the rental agreement based on certain triggering conditions. For example, if the data captured by the vehicle and stored to the ledger indicates that the renter is exhibiting consistent aggressive driving behaviors in violation of the rental agreement, then a notification may be provided to the owner, and the owner may be able to terminate the agreement. In some cases, the agreement may also automatically be terminated. In such cases, the remote functions may again be activated to allow the owner (for example, to allow the vehicle owner to command the vehicle to return to the rental location, among other functions). The analysis of the data to determine such triggering conditions and/or any other analysis of the data captured and stored to the ledger herein may be performed by one or more nodes of the distributed ledger network. As mentioned above, in some cases, there may exist one or more dedicated nodes on the distributed ledger network that are responsible for such analyses.

Additionally, while the owner of the vehicle may not be able to access some or all of the data being stored to the ledger throughout the duration of a rental agreement or otherwise, some or all of the data may become accessible in a similar manner to the remote functions described above. For example, some or all of the data may be made accessible to the owner on the ledger based on a request from the renter of the vehicle. As a second example, some or all of the data may be made accessible to the owner based on certain triggering conditions. For example, if it is determined that the vehicle has been stolen, the owner may have access to location information, speed information, interior and exterior image and/or video captures, and/or any other data that may be relevant. Additionally, in some cases, the owner of the vehicle may request access to certain types of data and/or certain remote functions of the vehicle. The request may be presented to the renter, who may accept or reject the request. Furthermore, although the owner may not necessarily be able to access some or all of the data on the ledger, notifications may be provided to the owner regarding particular types of data and/or evens associated with the vehicle. For example, while specific speed data may not be accessible be the owner (in some cases), the owner may be provided a notification (for example on an application on their mobile device) indicating that the vehicle is undergoing aggressive driving behaviors, the vehicle is low on gas or has a low battery charge, etc.

With reference to the drawings, FIG. 1 is a schematic diagram of an example system 100. The system 100 may be illustrative of the distributed ledger network as described above, and as such may include a network 102 of nodes. In some instances, the nodes may include vehicles, mobile devices, or any other type of system or device that may be a part of the network 102. The network 102 of nodes, for example, may include a blockchain that may be used for secure vehicle rental services as described above. As is illustrated in FIG. 1, the example system 100 may include one or more mobile devices (for example, mobile device 110, mobile device 112, and/or any other number of mobile devices), one or more vehicles (for example, vehicle 114, vehicle 116, vehicle 118, and/or any other number of vehicles), and/or one or more servers (for example, server 120), as well as any other types of nodes. The network 100 may also include communication media 104. The nodes may include at least any of the elements described with respect to FIG. 4 below (for example, one or more processor(s), memory, I/O interface(s), network interface(s), mass storage, etc.). The nodes may also include a ledger 130, for example, in the memory 404 or the mass storage 408.

In terms of the particular types of nodes described above, vehicles (for example, vehicle 114, vehicle 116, vehicle 118, and/or any other number of vehicles) may include driverless autonomous vehicles and/or driver-operated vehicles. The vehicles may also include internal combustion engines (ICE), may be hybrid vehicles, or may be fully electric vehicles. The vehicles may be vehicles included in a fleet of vehicles that may be rented by one or more rental customers (not depicted in the figure). In some cases, data may be captured by the vehicle and provided to the ledger 130. For example, the data 132 may include data associated with the operation of the vehicle, such as speed, heading, braking events, tire air pressure, heating, ventilation, and air conditioning (HVAC) and/or stereo system usage, fluid levels (for example, oil, transmission, coolant, etc.), engine rotations per minute (RPM), a current location of the vehicle, or any other types of data that may be captured by the vehicle. The data 132 may also include data pertaining to the external and environment surrounding the vehicle. For example, the vehicle may include one or more sensors, such as cameras, that may capture images and/or live video feeds of the external environment. The data 132 may also include data pertaining to particular conditions that may occur during operation of the vehicle. For example, the data 132 may provide an indication of aggressive driving behaviors (hard accelerations, hard braking, high RPMs, speeding, large g-forces, etc.), airbag deployment events, emergency calls made from the vehicle, diagnostic trouble codes (DTCs), towing events, indications of theft or damage to the vehicle, and/or the vehicle leaving a pre-defined geofenced region, to name a few examples. Some or all of this data 132 may be provided to the ledger for storage. For example, the data may be obtained by a telematics control unit (TCU) of the vehicle and provided to the ledger. The TCU may also control what data 132 is obtained by the vehicle. However, the data 132 may be obtained by any other vehicle systems as well. In some cases, any of the data mentioned above, as well as any other types of data 132, may be captured at any rate. For example, some or all of the data 132 may be captured continuously, or some or all of the data 132 may be captured periodically at particular time intervals. Further, some of the data may be captured only when certain triggering conditions take place (for example, airbag deployment data may be captured upon the triggering condition of an airbag deploying in the vehicle). The data 132 capture may be performed based on user-defined settings. For example, the owner of the vehicle may establish that the vehicle should provide vehicle speed data to the ledger 130 in 30 second intervals. The data capture may also be performed automatically. For example, artificial intelligence, machine learning, other such systems may be used to determine parameters associated with data capture (for example, what types of data 132 are captured, the intervals at which the data is captured, etc.) as well as changes to the manner in which the data is captured. In this manner, the data capture parameters may be adaptive and change over time or based on certain conditions. For example, if it is determined that the vehicle is experiencing frequent aggressive acceleration and braking, the vehicle may begin to capture and provide to the ledger 130 data more pertinent to aggressive driving behaviors and/or may begin capturing such data more frequently.

The mobile devices (for example, mobile device 110, mobile device 112, and/or any other number of mobile devices) may include portable devices, each having computing resources and communication resources that permit sending, receiving, or exchanging data and/or signaling wirelessly with an external electronic device (mobile or otherwise). For instance, the mobile devices can include a mobile telephone (such as a smartphone), a tablet computer, a wearable, a laptop computer, a gaming console, an electronic reader (e-reader), or any other type of device. The mobile devices may also include one or more applications 134, which may be used by the one or more rental customers and/or one or more vehicle owners in association with a vehicle rental service. For example, the application may include a user interface that may allow rental customers to request a vehicle rental, enter rental preferences, request assistance from an owner during the duration of a rental agreement, etc. The user interface may also allow the one or more owners of the vehicles to track vehicle rentals, perform certain remote functions associated with certain vehicles, receiving data and/or notifications about particular vehicles, etc. The servers (for example, server 120) may, in some cases, be dedicated nodes in the network 102 for managing analysis of any data produced by the vehicles in the network 102, as well as any other operations associated with the rental service as described herein (for example, identifying a triggering condition that may result in a remote vehicle function being activated for a vehicle owner, or any other operations). The one or more servers may include artificial intelligence, machine learning, or other similar types of systems that may allow for certain operations described herein to be performed automatically (for example, instead of activating remote vehicle functions for the owner, the one or more servers may automatically perform the remote control). However, in some cases, any other nodes and/or combinations of nodes and/or types of nodes may also perform such analyses and/or any of the other nodes may also include artificial intelligence, machine learning, and/or similar systems. Additionally, in some cases, the network 102 may not include the one or more servers.

The communication media 104 may permit exchanging data and/or signaling wirelessly between nodes in the network 102. That is, the communication media 104 may permit exchanging data and/or signaling between vehicles, between mobile devices, and/or between vehicles and mobile devices in the network 102. The communication media 104 can include communication links, base stations, access points, and/or multiple network devices (such as server devices, gateway devices, and the like). Such a communication media 11104 5 can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication media 104 can also include wired communications, such as through Ethernet, for example.

Finally, the ledger 130 may be a decentralized and distributed information source that may be continuously updated, distributed, and/or stored at the nodes. Some or all nodes of the one or more nodes may also have access to and/or have stored the same or a similar ledger 130. This may allow the nodes to be apprised of the same ledger information (such as, for example, the data 132) at any given time. In one particular implementation, the ledger 130 may include information in the form of a blockchain. In such an implementation, blockchain can include one or many blocks of data. Updating the ledger 130 can thus include, for example, adding a block of data corresponding to the ledger record. To reduce the amount of information saved at the ledger 156, and thus reduce the storage requirements of each of the nodes, information may be stored remotely from the ledger 130 (for example, at server 120, or any other location). That is, the ledger 130 may simply include pointers to such information.

Figure 2:
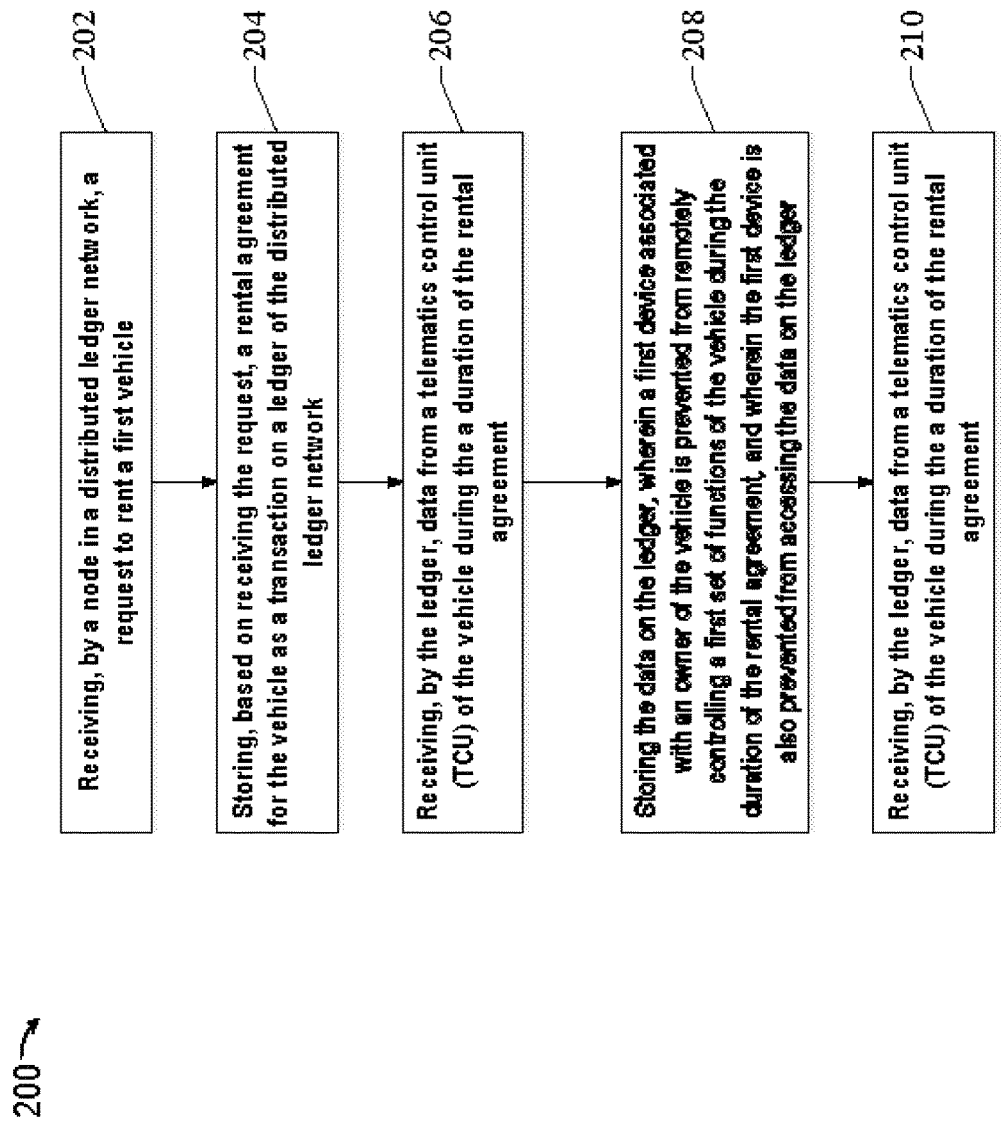
FIG. 2 illustrates an example of a method, in accordance with one or more embodiments of this disclosure.

FIG. 2 is an example method 200. At block 202 of the method 200 in FIG. 2, the method 200 may include receiving, by a node in a distributed ledger network, a request to rent a first vehicle. At block 204 of the method 200 in FIG. 2, the method 200 may include storing, based on receiving the request, a rental agreement for the vehicle as a transaction on a ledger of the distributed ledger network. At block 206 of the method 200 in FIG. 2, the method 200 may include receiving, by the ledger, data from a telematics control unit (TCU) of the vehicle during the a duration of the rental agreement. At block 208 of the method 200 in FIG. 2, the method 200 may include storing the data on the ledger, wherein a first device associated with an owner of the vehicle is prevented from remotely controlling a first set of functions of the vehicle during the duration of the rental agreement, and is also prevented from accessing the data on the ledger. At block 210 of the method 200 in FIG. 2, the method 200 may include enabling, based on the data from the TCU of the vehicle, the first device to perform remote control of the first set of functions of the vehicle.

The operations described and depicted in the illustrative process flow of FIG. 2 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIG. 2 may be performed.

In some embodiments, the method 200 may also include receiving, from the first device, an instruction to perform a first function of the first set of functions. The method 200 may also include determining, by the distributed ledger network that the first device has been enabled to perform the first function. The method 200 may also include performing the first function at the vehicle. The method 200 may also include automatically performing, by the node of the distributed ledger network and based on the data from the TCU, a first function of the first set of functions at the vehicle. The method may also include receiving, from the second device, a request for assistance. The method may also include enabling, based on the request for assistance, the first device to perform remote control of the first set of functions of the vehicle. In some embodiments, enabling the first device to perform remote control of the first set of functions of the vehicle, is based on a determination that the vehicle has performed an action that is in violation of the rental agreement. In some embodiments, the first device is enabled to remotely controlling a second set of functions of the vehicle during the duration of the rental agreement. In some embodiments, the ledger is a Blockchain ledger.

FIG. 3 illustrates an example computing device 300, in accordance with one or more embodiments of this disclosure. The computing 300 device may be representative of any number of elements described herein, such as any of the nodes in the network 102 described with respect to FIG. 1, or any other elements described herein. The computing device 300 may include at least one processor 302 that executes instructions that are stored in one or more memory devices (referred to as memory 304). The instructions can be, for instance, instructions for implementing functionality described as being carried out by one or more modules and systems disclosed above or instructions for implementing one or more of the methods disclosed above. The processor(s) 302 can be embodied in, for example, a CPU, multiple CPUs, a GPU, multiple GPUs, a TPU, multiple TPUs, a multi-core processor, a combination thereof, and the like. In some embodiments, the processor(s) 302 can be arranged in a single processing device. In other embodiments, the processor(s) 302 can be distributed across two or more processing devices (e.g., multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 302 can access the memory 304 by means of a communication architecture 306 (e.g., a system bus). The communication architecture 306 may be suitable for the particular arrangement (localized or distributed) and type of the processor(s) 302. In some embodiments, the communication architecture 306 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

In addition to storing executable instructions, the memory 304 also can retain data, such as any ledger 156 information, among other data.

Each computing device 300 also can include mass storage 308 that is accessible by the processor(s) 302 by means of the communication architecture 306. The mass storage 308 can include machine-accessible instructions (e.g., computer-readable instructions and/or computer-executable instructions). In some embodiments, the machine-accessible instructions may be encoded in the mass storage 308 and can be arranged in components that can be built (e.g., linked and compiled) and retained in computer-executable form in the mass storage 308 or in one or more other machine-accessible non-transitory storage media included in the computing device 300. Such components can embody, or can constitute, one or many of the various modules disclosed herein. Such modules are illustrated as modules 314.

Execution of the modules 314, individually or in combination, by at least one of the processor(s) 302, can cause the computing device 300 to perform any of the operations described herein (for example, the operations described with respect to FIG. 2, as well as any other operations).

Each computing device 300 also can include one or more input/output interface devices 310 (referred to as I/O interface 310) that can permit or otherwise facilitate external devices to communicate with the computing device 300. For instance, the I/O interface 310 may be used to receive and send data and/or instructions from and to an external computing device. The computing device 300 also includes one or more network interface devices 312 (referred to as network interface(s) 312) that can permit or otherwise facilitate functionally coupling the computing device 300 with one or more external devices. Functionally coupling the computing device 300 to an external device can include establishing a wireline connection or a wireless connection between the computing device 300 and the external device. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (e.g., data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (e.g., data from one component interacting with another component in a local system, distributed system, and/or across a network such as a wide area network with other systems via the signal). In addition, or in other embodiments, modules can communicate or otherwise be coupled via thermal, mechanical, electrical, and/or electro-mechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (e.g., computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A system comprising:
one or more processors; and
a memory storing computer-executable instructions, that when executed by the one or more processors, cause the one or more processors to:
receive, by a node in a distributed ledger network, a request to rent a first vehicle from a user device;
store, based on receiving the request, a first rental agreement for the first vehicle as a transaction on a ledger of the distributed ledger network;
receive, by the ledger, a first type of data from a first telematics control unit (TCU) of the first vehicle during a duration of the first rental agreement;
store the first type of data on the ledger, wherein a first device associated with an owner of the first vehicle is prevented, based on the first rental agreement, from remotely controlling a first set of functions of the first vehicle during the duration of the first rental agreement while the vehicle is in use, wherein the first device is enabled, based on the first rental agreement, to remotely control a second set of functions of the first vehicle during the duration of the first rental agreement, and wherein the first device is also prevented from accessing the data on the ledger;
enable, based on the data from the first TCU of the first vehicle, the first device to perform remote control of the first set of functions of the first vehicle; and
automatically perform, by the first vehicle and based on the first type of data from the first TCU and an instruction from the first device, a first function of the first set of functions at the first vehicle.

2. The system of claim 1, wherein the computer-executable instructions further cause the one or more processors to:
receive, from the first device, the instruction to perform the first function of the first set of functions;
determine, by the distributed ledger network that the first device has been enabled to perform the first function; and
automatically perform the first function at the first vehicle.

3. The system of claim 1, wherein the request to rent the first vehicle is received from a second device of a user, and wherein the computer-executable instructions further cause the one or more processors to:
receive, from the second device, a request for assistance from the owner; and
enable, based on the request for assistance, the first device to perform remote control of the first set of functions of the first vehicle.

4. The system of claim 1, wherein enabling the first device to perform remote control of the first set of functions of the first vehicle, is based on a determination that the first vehicle has performed an action that is in violation of the first rental agreement.

5. The system of claim 1, wherein the ledger is a Blockchain ledger.

6. A method comprising:
receiving, by a node in a distributed ledger network, a request to rent a vehicle;
storing, based on receiving the request, a rental agreement for the vehicle as a transaction on a ledger of the distributed ledger network;
receiving, by the ledger, data from a telematics control unit (TCU) of the vehicle during a duration of the rental agreement;
storing the data on the ledger, wherein a first device associated with an owner of the vehicle is prevented, based on the rental agreement, from remotely controlling a first set of functions of the vehicle during the duration of the rental agreement while the vehicle is in use, wherein the first device is enabled, based on the rental agreement, to remotely control a second set of functions of the vehicle during the duration of the rental agreement, and wherein the first device is also prevented from accessing the data on the ledger; and
enabling, based on the data from the TCU of the vehicle, the first device to perform remote control of the first set of functions of the vehicle; and
automatically performing, by the node of the distributed ledger network and based on the data from the TCU and an instruction from the first device, a first function of the first set of functions at the vehicle.

7. The method of claim 6, further comprising:
receiving, from the first device, the instruction to perform the first function of the first set of functions;
determining, by the distributed ledger network that the first device has been enabled to perform the first function; and
automatically performing the first function at the vehicle.

8. The method of claim 6, wherein the request to rent the vehicle is received from a second device of a user, and wherein the method further comprises:
receiving, from the second device, a request for assistance from the owner; and
enabling, based on the request for assistance, the first device to perform remote control of the first set of functions of the vehicle.

9. The method of claim 6, wherein enabling the first device to perform remote control of the first set of functions of the vehicle, is based on a determination that the vehicle has performed an action that is in violation of the rental agreement.

10. The method of claim 6, wherein the first device is enabled to remotely controlling a second set of functions of the vehicle during the duration of the rental agreement.

11. The method of claim 6, wherein the ledger is a Blockchain ledger.

12. A non-transitory computer-readable medium storing computer-executable instructions, that when executed by at least one processor, cause the at least one processor to:
receiving, by a node in a distributed ledger network, a request to rent a vehicle;
storing, based on receiving the request, a rental agreement for the vehicle as a transaction on a ledger of the distributed ledger network;
receiving, by the ledger, data from a telematics control unit (TCU) of the vehicle during a duration of the rental agreement;
storing the data on the ledger, wherein a first device associated with an owner of the vehicle is prevented, based on the rental agreement, from remotely controlling a first set of functions of the vehicle during the duration of the rental agreement while the vehicle is in use, wherein the first device is enabled, based on the rental agreement, to remotely control a second set of functions of the vehicle during the duration of the rental agreement, and wherein the first device is also prevented from accessing the data on the ledger; and
enabling, based on the data from the TCU of the vehicle, the first device to perform remote control of the first set of functions of the vehicle; and automatically perform, by the node of the distributed ledger network and based on the data from the TCU and an instruction from the first device, a first function of the first set of functions at the vehicle.

13. The non-transitory computer-readable medium of claim 12, wherein the computer-executable instructions further cause the at least one processor to:
   receive, from the first device, the instruction to perform the first function of the first set of functions;
   determine, by the distributed ledger network that the first device has been enabled to perform the first function; and
   automatically perform the first function at the vehicle.

14. The non-transitory computer-readable medium of claim 12, wherein the request to rent the vehicle is received from a second device of a user, and wherein the computer-executable instructions further cause the processor to:
   receive, from the second device, a request for assistance from the owner; and
   enable, based on the request for assistance, the first device to perform remote control of the first set of functions of the vehicle.

15. The non-transitory computer-readable medium of claim 12, wherein enabling the first device to perform remote control of the first set of functions of the vehicle, is based on a determination that the vehicle has performed an action that is in violation of the rental agreement.

16. The system of claim 1, wherein the computer-executable instructions further cause the one or more processors to:
   register the user device for access to the first vehicle using phone-as-a-key (PaaK);
   determine, by the vehicle, that the user device is within a threshold distance of the first vehicle; and
   automatically unlock the first vehicle to provide access to the first vehicle.

17. The system of claim 1, wherein the computer-executable instructions further cause the one or more processors to:
   prevent a user associated with the user device from causing the first vehicle to perform the second set of functions of the first vehicle during the duration of the first rental agreement.

18. The system of claim 1, wherein the computer-executable instructions further cause the one or more processors to:
   receive, by a node in a distributed ledger network, a request to rent a second vehicle, wherein the first vehicle is a first type of vehicle and the second vehicle is a second type of vehicle;
   store, based on receiving the request, a second rental agreement for the second vehicle as a transaction on a ledger of the distributed ledger network; and
   receive, by the ledger, a second type of data from a second telematics control unit (TCU) of the second vehicle during a duration of the second rental agreement, wherein the second type of data is different than the first type of data, wherein the second type of data is received instead of the first type of data based on the second vehicle being the second type of vehicle.

* * * * *